(12) United States Patent
Miki et al.

(10) Patent No.: US 7,803,444 B2
(45) Date of Patent: Sep. 28, 2010

(54) OPTICAL DISK AND METHOD OR PRODUCING OPTICAL DISK

(75) Inventors: Takeshi Miki, Tokyo (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 11/768,490

(22) Filed: Jun. 26, 2007

(65) Prior Publication Data

US 2008/0253271 A1    Oct. 16, 2008

(30) Foreign Application Priority Data

Jun. 29, 2006   (JP) ............................. 2006-179988

(51) Int. Cl.
*B32B 3/02*   (2006.01)
(52) U.S. Cl. ................. 428/64.1; 428/64.4; 430/270.12
(58) Field of Classification Search .................. None
See application file for complete search history.

(56) References Cited

U.S. PATENT DOCUMENTS 7,177,264 B2 *   2/2007  Aratani et al. .............. 369/288

2005/0112019 A1 *   5/2005  Nakai et al. .................. 420/550

FOREIGN PATENT DOCUMENTS

| JP | 2000348383 | A | * | 12/2000 |
| JP | 2002074752 |   | * | 3/2002 |
| JP | 2003-317318 |   |   | 11/2003 |
| JP | 2006-134385 |   |   | 5/2006 |

\* cited by examiner

*Primary Examiner*—Elizabeth Mulvaney
(74) *Attorney, Agent, or Firm*—Sonnenschein Nath & Rosenthal LLP

(57) ABSTRACT

An optical disk is disclosed. The optical disk includes a substrate having lands and pits arranged and formed along a recording track so that data are recorded; a reflective film deposited on the substrate; and a protective layer formed on the reflective film, where an edge of the pits in the array direction is irradiated with light from a side of the protective layer to deform the pits, so that pit data are rewritten and recorded, and the reflective film includes an alloy formed of AlFeX having Al as a main component, where X contains any one or more of Ti, Cu, Au, Pt, and Si.

5 Claims, 6 Drawing Sheets

Table 1

Al60M40

| Element Added (M) | Ra | Constant Temperature/ Constant Humidity Test |
|---|---|---|
| Fe | ○ | ○ |
| Ti | ○ | ○ |
| Cu | ○ | ○ |
| Au | ○ | ○ |
| Pt | ○ | ○ |
| Si | ○ | ○ |
| Ag | ○ | × |
| Sb | ○ | × |
| Te | ○ | × |

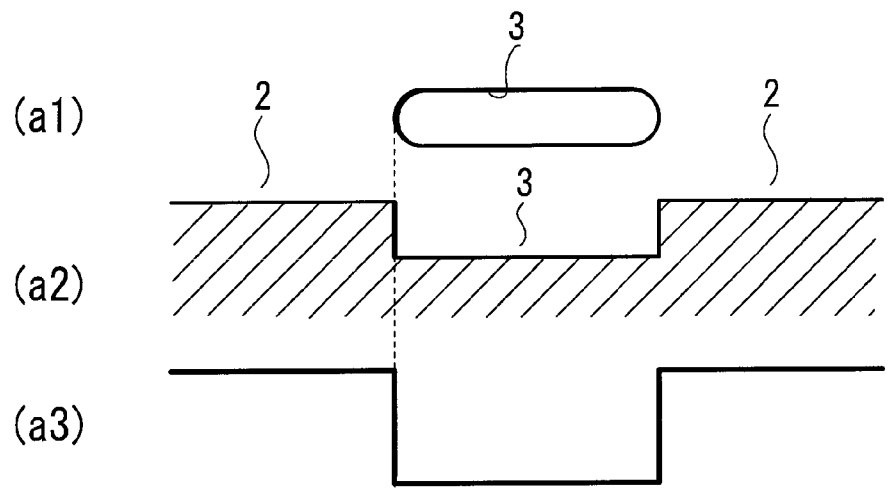
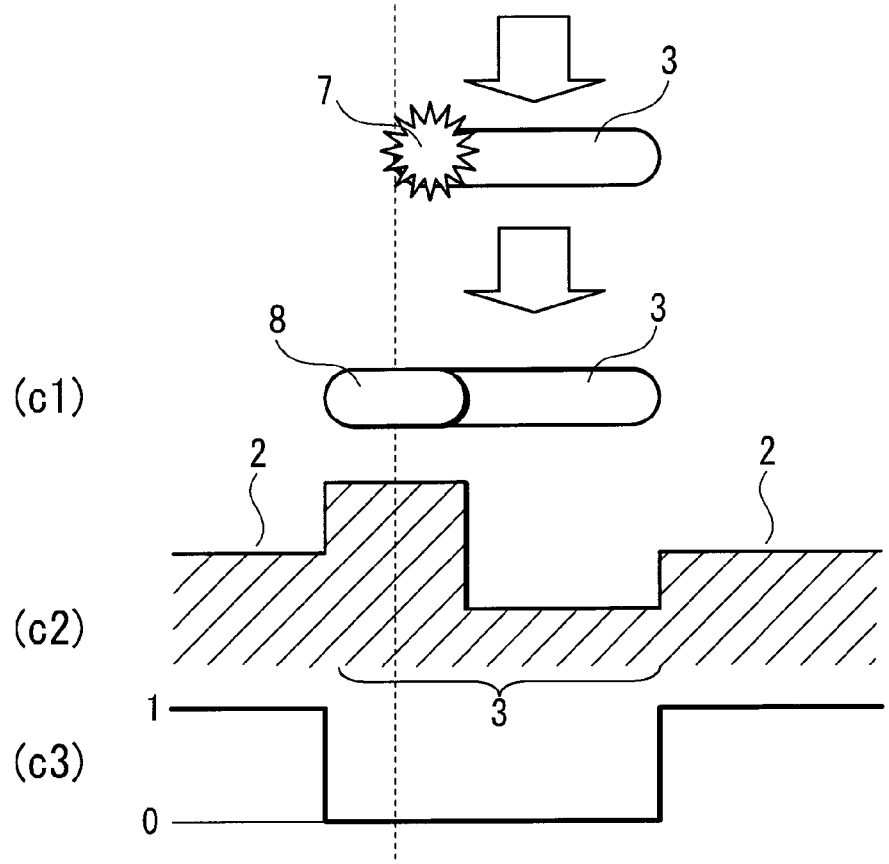
FIG. 4A
FIG. 4B
FIG. 4C

FIG. 7

Table 2

Film Thickness: 40 nm $Al_{(100-x-y)}\_Fe_{(x)}\_Ti_{(y)}$

| Sample No. | x | y | Reflectance (>35%) | Recordable |
|---|---|---|---|---|
| 1 | 5 | 5 | ○ | × |
| 2 | 5 | 10 | ○ | ○ |
| 3 | 5 | 15 | ○ | ○ |
| 4 | 10 | 5 | ○ | ○ |
| 5 | 10 | 10 | ○ | ○ |
| 6 | 10 | 15 | ○ | ○ |
| 7 | 15 | 5 | ○ | ○ |
| 8 | 15 | 10 | ○ | ○ |
| 9 | 15 | 15 | ○ | ○ |
| 40 | 20 | 20 | × | ○ |

Film Thickness: 20 nm

| Sample No. | x | y | Reflectance (>35%) | Recordable |
|---|---|---|---|---|
| 11 | 3 | 3 | ○ | × |
| 12 | 4 | 4 | ○ | × |
| 13 | 5 | 7 | ○ | ○ |
| 14 | 7 | 7 | ○ | ○ |
| 15 | 11 | 11 | ○ | ○ |
| 16 | 11 | 20 | ○ | ○ |
| 17 | 15 | 15 | × | ○ |
| 18 | 20 | 11 | × | ○ |

Film Thickness: 10 nm

| Sample No. | x | y | Reflectance (>35%) | Recordable |
|---|---|---|---|---|
| 19 | 1 | 1 | ○ | × |
| 20 | 3 | 3 | ○ | ○ |
| 21 | 6 | 6 | ○ | ○ |
| 22 | 11 | 11 | × | ○ |

OPTICAL DISK AND METHOD OR PRODUCING OPTICAL DISK

CROSS REFERENCES TO RELATED APPLICATIONS

The present invention contains subject matter related to Japanese Patent Application JP 2006-179988 filed in the Japanese Patent Office on Jun. 29, 2006, the entire contents of which being incorporated herein by reference.

BACKGROUND OF THE INVENTION

1. Field of the Invention

The present invention relates to an optical disk complied with a Blu-ray Disc on which data are recorded using a combination of pits and lands, and a method of producing the optical disk.

2. Description of the Related Art

Read-only ROM (Read on Memory) disks may be mass produced from one stamper by injection molding in a fairly short time, and various data are recorded on the disk including management information or content information such as music and images using a combination of lands and pits simultaneously with molding of the disks.

Accordingly, a large number of replica optical disks called pirated optical disks may be illegally produced with ease from legitimate ROM disks, and hence a method for preventing the illegal production may be required with various manners.

Each of the legitimate optical disks on which main data such as management information or content information are recorded is preferably configured so that secondary data such as ID data based on a code, a mark, or the like may be recorded on the disk in order to certify that the disk is a legitimate optical disk.

In contrast, Japanese Unexamined Patent Application Publication No. 2006-134385 discloses a Blu-ray Disc that is a read-only ROM optical disk on which data such as management information or content information are recorded using a combination of pits and lands, where a mark pre-formed by mastering the disk is irradiated with high output laser light to deform part of the mark, specifically, to deform an irregular pattern of the pits and the lands, so that the ID data or the like are recorded.

In a ROM Blu-ray Disc, a reflective film is formed on an optical disk substrate having a pit array involving main data, and a protective layer is formed on the reflective film. The disk is irradiated with reproduction laser light from a side of the protective layer, so that information is retrieved.

Accordingly, in the Blu-ray Disc, a surface roughness of the reflective film is a noise of a reproduction signal.

The Blu-ray Disc including an Ag alloy to have sufficient optical properties at a blue laser wavelength. This Blu-ray Disc has sufficient optical properties because a reflective film of the disk has a small surface roughness Ra (center line average roughness) and a high reflectance.

However, when the secondary data are recorded in a typical reflective film having Ag by irregular deformation of lands and pits, it is difficult to increase recording sensitivity and to control a recording laser power to 20 mW or less, because the film has high thermal conductivity.

In contrast, Japanese Unexamined Patent Application Publication No. 2003-317318 discloses a ROM optical disk including an Al alloy reflective film in which recording is to be performed.

The Al alloy reflective film is cost effective since that the film is less expensive than an Ag alloy reflective film. However, there has yet been developed a ROM optical disk including the Al alloy reflective film in which surface roughness is controlled, and which has improved recording sensitivity and satisfactory optical properties such as reflection and absorption properties suitable for a Blu-ray Disc in which information is recorded by irregular deformation of lands and pits.

SUMMARY OF THE INVENTION

According to embodiments of the present invention, a read-only Blu-ray Disc including a pre-formed land-pit array and a reflective film formed on the array, where an edge of pits are irradiated with recording laser light and deformed so that information is recorded, the optical disk which may have reduced recording sensitivity and improved surface properties of the reflective film, and a method of producing the optical disk.

An optical disk according to an embodiment of the present invention includes a substrate having lands and pits arranged and formed along a recording track so that data are recorded; a reflective film deposited on the substrate; and a protective layer formed on the reflective film, where an edge of the pits in the array direction is irradiated with light from a side of the protective layer to deform the pits, so that pit data are rewritten and recorded, and the reflective film includes an alloy having AlFeX having Al as a main component, where X contains any one or more of Ti, Cu, Au, Pt, and Si.

In an optical disk according to an embodiment of the present invention, the reflective film has a thickness of 10 nm to 40 nm. In an optical disk according to an embodiment of the present invention, the reflective film includes $Al_{(100-x-y)}Fe_xTi_y$, where x is selected from a range between 3 to 15 and y is selected from a range between 3 to 15.

A method of producing an optical disk according to an embodiment of the present invention includes the steps of preparing a substrate having lands and pits arranged and formed along a recording track by mastering so that data are recorded; depositing a reflective film on a surface having the lands and the pits formed of the substrate; forming a protective layer on the reflective film; and irradiating an edge of the pits in the array direction with recording laser light from a side of the protective layer to deform the pits, so that data by the pits are bit shifted by deformation of the pits to record data by rewriting. In the method of producing an optical disk, the step of depositing the reflective film is a step of depositing an alloy formed of AlFeX having Al as a main component, where X contains any one or more of Ti, Cu, Au, Pt, and Si.

In a method of producing an optical disk according to an embodiment of the present invention, the reflective film has a thickness of 10 nm to 40 nm.

A method of producing an optical disk according to an embodiment of the present invention further includes the step of depositing the reflective film as an alloy formed of $Al_{(100-x-y)}Fe_xTi_y$, where x is selected from a range between 3 to 15 and y is selected from a range between 3 to 15.

In an optical disk according to an embodiment of the present invention including a reflective film having the aforementioned composition, the reflective film has excellent surface properties and durability. An edge of pits in a pre-formed land-pit array is irradiated with laser light for a Blu-ray Disc according to recorded data to deform the edge of the pits causing a bit shift, so that an ID unique to each optical disk may be recorded by rewriting a record based on the pre-formed land-pit array by the bit shifting. According to an embodiment of the present invention, a reflective film may allow a recording power to decrease, have a reflectance suitable for reproduction, and have excellent surface properties and durability; that is, an optical disk may have excellent reproducing properties and durability.

In a method of producing an optical disk according to an embodiment of the present invention, data are previously recorded using a land-pit array during molding, and an optical disk including a reflective film having the aforementioned composition is irradiated with laser light according to the recorded data to deform an edge of pits and cause a bit shift, so that an ID unique to each optical disk is recorded. Therefore, a ROM optical disk may be formed with excellent reproducing properties in a low recording power.

BRIEF DESCRIPTION OF THE DRAWINGS

FIG. 4 is a view illustrating a second recording mode of an optical disk according to an embodiment of the present invention.

FIG. 7 is a table showing a film thickness, a reflectance, and recordability of an optical disk according to an embodiment of the present invention.

DESCRIPTION OF PREFERRED EMBODIMENTS

An optical disk and a method of producing an optical disk according to an embodiment of the present invention will be described; however, the present invention is not limited to the embodiment.

Figures 1, 2:
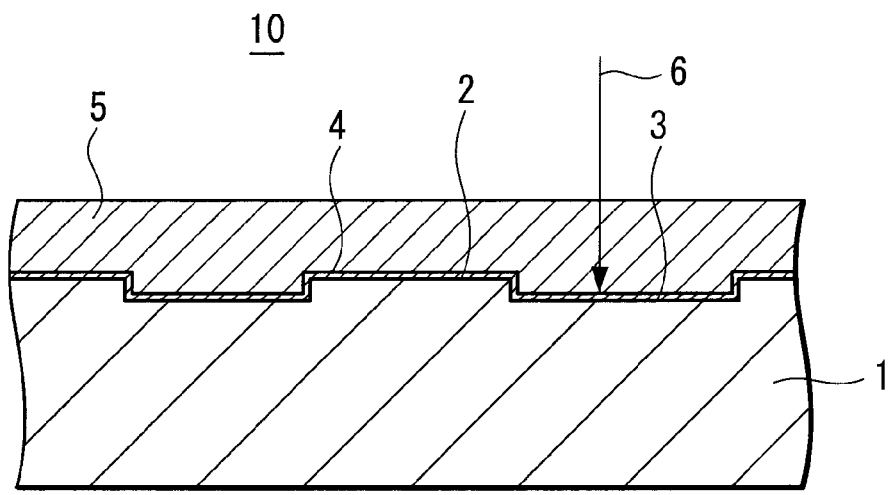
FIG. 1 is a schematic cross-sectional view of a main part of an example of an optical disk according to an embodiment of the present invention.
FIG. 2 is a table showing results of measuring a surface roughness Ra of various Al alloy layers and results of a constant temperature/constant humidity test.

FIG. 1 is a schematic cross-sectional view of an optical disk according to an embodiment of the present invention.

In the optical disk 10, a plastic substrate 1 has lands 2 and pits 3 according to a regulation by a predetermined variable length modulation system which are continuously arranged and formed along a recording track; a reflective film 4 is deposited on the plastic substrate 1; and a protective layer 5 is formed on the reflective film 4. The disk is irradiated with laser light 6 having a wavelength of 405 nm which is laser light for a Blu-ray Disc from a side of the protective layer 5.

The reflective film 4 includes AlFeX having Al as a main component, where X is formed of an alloy containing any one or more of Ti, Cu, Au, Pt, and Si.

The reflective film 4 has a thickness of 10 nm to 40 nm.

The reflective film 4 includes $Al_{(100-x-y)}Fe_xTi_y$, where x is selected from a range between 3 to 15 and y is selected from a range between 3 to 15.

A method of producing an optical disk according to an embodiment of the present invention includes the steps of: preparing a substrate 1 having lands 2 and pits 3 continuously arranged and formed along a recording track by mastering; depositing a reflective film 4 having the above composition and film thickness on a surface having the lands 2 and the pits 3 formed of the substrate 1 by sputtering, vapor deposition, or the like; and forming a protective layer 5 on the reflective film 4.

Further, the method includes the step of irradiating an edge of the pits 3 in the array direction of the pits 3 with recording laser light from a side of the protective layer 5 to deform the edge of the pits and cause a bit shift in data by deformation of the pits 3, so that data recording by rewriting called BUID (Blu-ray unique ID) is performed. Mastering to mold the substrate 1 may be performed by typical mastering.

In an optical disk according to an embodiment of the present invention, an irregular pattern according to a land-pit array based on original data in a ROM disk, specifically, management information or content information such as music and images is formed along a recording track on the substrate 1 by the aforementioned mastering.

Since the reflective film 4 in an optical disk according to an embodiment of the present invention is formed of an Al alloy, thermal conductivity of the reflective film 4 is smaller than that of a reflective film formed of an Ag alloy, so that the disk has improved recording sensitivity.

However, a reflective film formed of a single Al element has an extremely high surface roughness Ra (center line average roughness) of 2 nm or more. Having such a high Ra may result in a disk noise.

In an embodiment of the present invention, the reflective film 4 is formed of an Al alloy containing Al, Fe, and another element X, where X represents Ti, Au, Pt, Si, or Cu.

FIG. 2 Table 1 is a table showing results of measuring a surface roughness Ra of an Al alloy film of each sample in which an alloy film of $Al_{60}M_{40}$, where M represents Fe, Ti, Cu, Au, Pt, Si, Ag, Sb, or Te, having a thickness of 30 nm is deposited on a glass substrate by sputtering, and results of a constant temperature/constant humidity test at 80° C. at a relative humidity of 85% for 200 hours.

In the table, a case where Ra is 0.8 nm or less is indicated by a symbol "○" and a case where Ra is more than 0.8 nm is indicated by a symbol "×". With the constant temperature/constant humidity test, a case where no corrosion has occurred is indicated by a symbol "○" and a case where corrosion has occurred is indicated by a symbol "×". Accordingly, a reflective film formed of an alloy containing Al and Fe, Ti, Cu, Au, Pt, or Si has high Ra and excellent durability measured in the constant temperature/constant humidity test. The reflective film 4 in an embodiment of the present invention formed of AlFeX, where X is Ti, Cu, Au, Pt, or Si, has high Ra and excellent corrosion resistance.

FIGS. 3 and 4 are views illustrating first and second recording/reproducing modes, respectively.

In an embodiment of the present invention, the reflective film 4 in the configuration shown in FIG. 1 is formed of $Al_{(100-x-y)}Fe_xTi_y$. In this case, the substrate 1 is formed of a PC (polycarbonate) substrate having a thickness of 1.1 mm. As shown in plan views (a1) and cross-sectional views (a2) of FIGS. 3(a) and 4(a), a land-pit array of the lands 2 and the pits 3 is formed on one main surface of the substrate 1 by injection molding using a stamper. The reflective film 4 having a thickness of 10 nm to 40 nm is deposited on the substrate 1 having the land-pit array by sputtering.

The metal film 4 is coated with a UV resin (ultraviolet curable resin) having a thickness of 0.1 mm to form the protective layer 5.

An optical disk having the above configuration is irradiated with Blu-ray Disc (BD) compliant laser light having a wavelength of 405 nm from an optical system having a numerical aperture (N.A.) of 0.85 to perform recording and reproduction. Before recording, a reproduction signal schematically shown in FIGS. 3(a3) and 4(a3) is obtained. As shown in FIGS. 3(b) and 4(b), an edge of the pit 3 of the optical disk 10 is irradiated with recording laser light. FIGS. 3(b) and 4(b) schematically show a part irradiated with recording laser light 7 of the pit 3.

Figure 5:
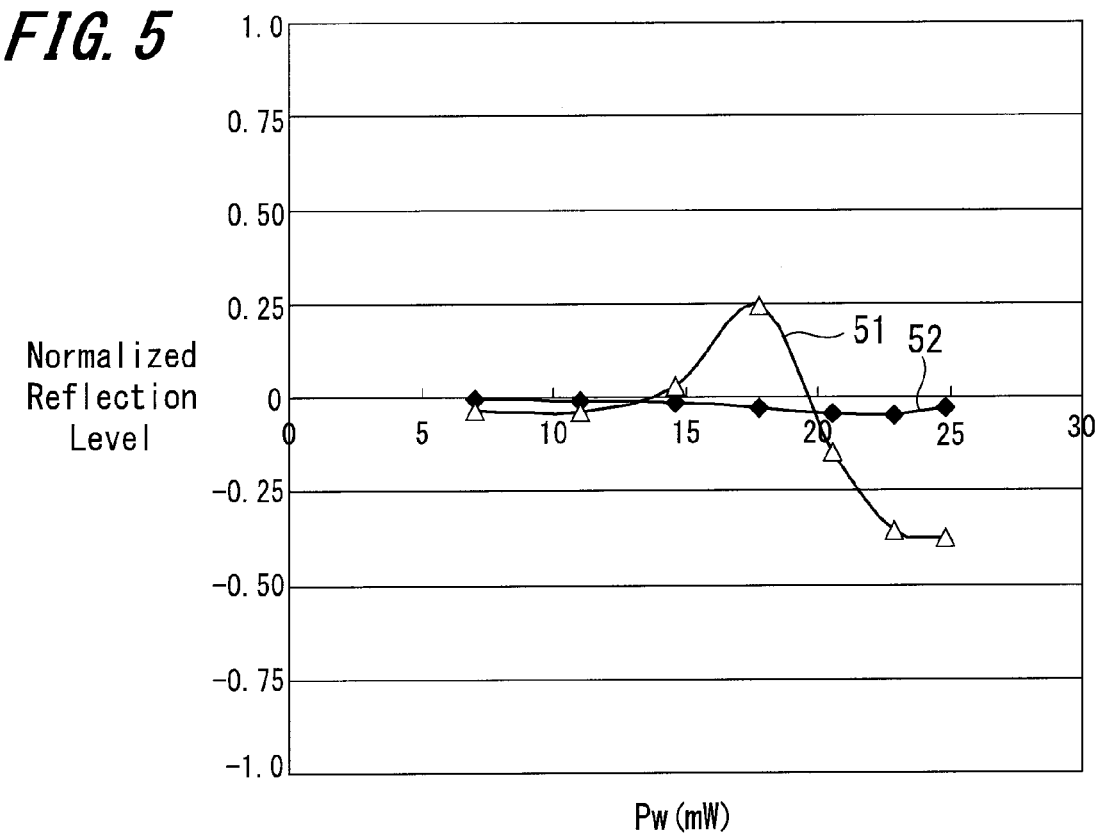
FIG. 5 is a measurement curve of a recording laser power to an optical disk according to a comparative example of the present invention and a reflection level of the optical disk.

FIG. 5 is a view plotting values obtained by integrating a recording power Pw (mW) and an output of a recording portion in the light irradiation portion 7 measured by a reflection level measuring apparatus, where a curve 51 indicates when using 4 is $Al_{72}Fe_{14}Ti_{14}$ for the reflective film and a curve 52 indicates when using $Al_{88}Fe_6Ti_6$ for the reflective film 4 as a comparative example. A reflection level is measured using an oscilloscope Tektronix TDS5104 and evaluated based on the measurement result.

As clear from the curve 51, in an optical disk according to an embodiment of the present invention, a reflection level gets rapidly high in the negative direction when a recording power exceeds 20 mW. In contrast, in the curve 52, a reflection level remains unchanged and a recording effect is not obtained.

The reflective film 4 has a thickness of 10 nm to 40 nm, and preferably 15 nm to 30 nm. When the thickness is less than 15 nm, in particular less than 10 nm, the reflective film is insufficiently formed; and when the thickness exceeds 30 nm, in particular more than 40 nm, a reflectance or the like and an effect on reducing a surface roughness are ceased to be in effect, thereby resulting in lower productivity and higher cost.

EXAMPLE 1

In this example, in a configuration of FIG. 1, a reflective film 4 having a composition of $Al_{70}Fe_{15}Cu_{15}$ and a thickness of 40 nm is deposited by sputtering.

Figure 3A:
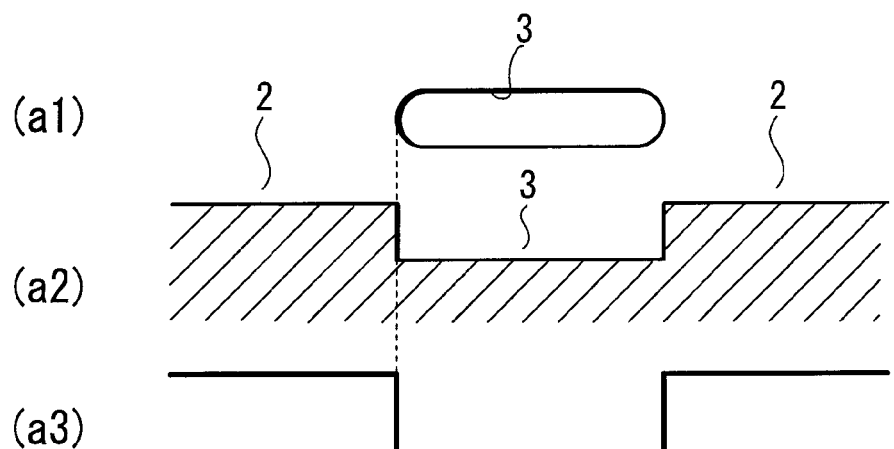
FIG. 3 is a view illustrating a first recording mode of an optical disk according to an embodiment of the present invention.
Figure 3B:
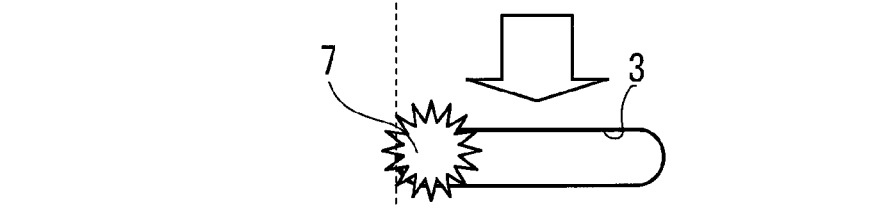

A substrate 1 is formed of a PC substrate having an array of lands 2 and pits 3 formed along a recording track as shown in (a1) and (a2) of FIG. 3(a) in the manner as described above. When scanning with laser light based on a reproduction laser power in the direction of the recording track, a reproduction signal level caused by reflected light is high in the land 2 and is low in the pit 3 where reflected light is scarcely detected, as shown in FIG. 3(a3).

Figure 3C:
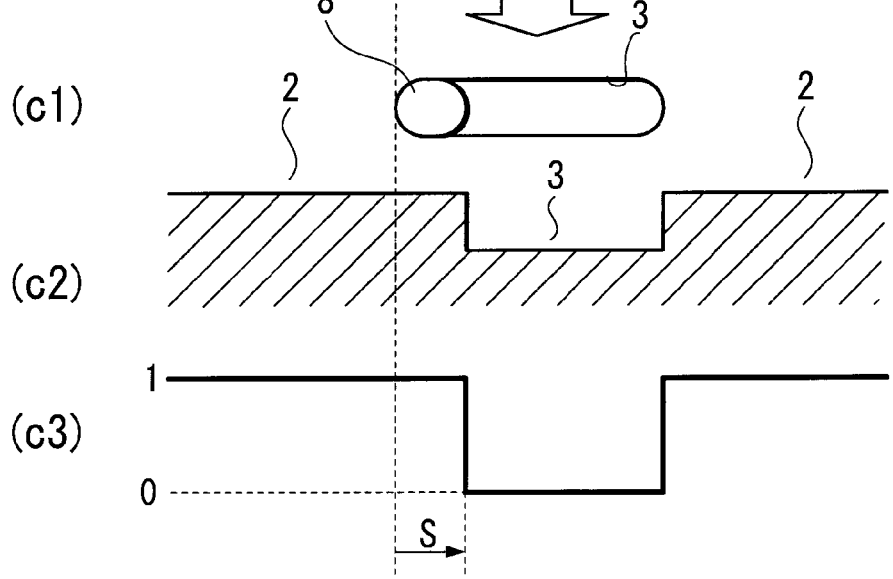
Figure 6:
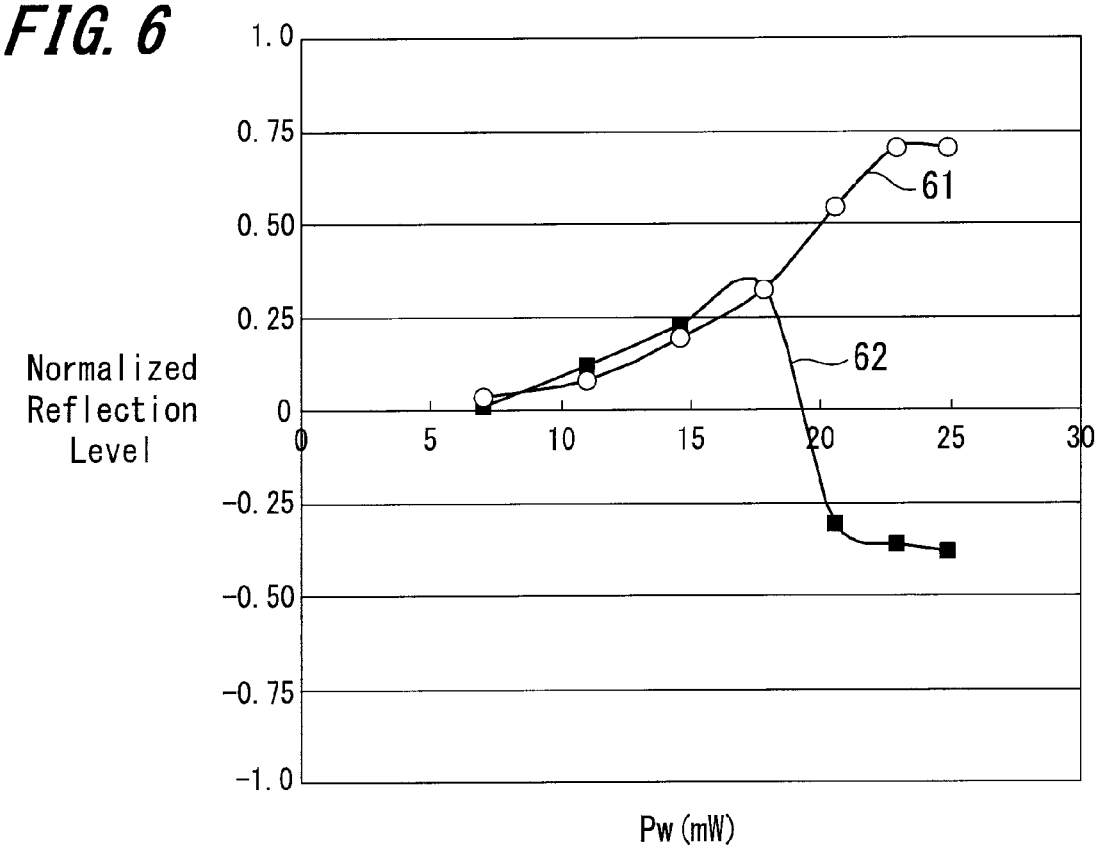
FIG. 6 is a measurement curve of a recording laser power to an optical disk according to an example of the present invention and a reflection level of the optical disk.

If a light irradiation portion 7 corresponds to an edge in the pit 3 shown in FIG. 3(b), a deformed portion 8 is formed in the light irradiation portion 7 and the vicinity thereof by recording as shown in (c1) of FIG. 3(c). In this case, when the deformed portion 8 is raised to a height equal to that of the land 2 as shown in FIG. 3(c2), a reproduction signal level is as high as that obtained in the land 3 as shown in FIG. 3(c3). Specifically, a length of the pit 3 is substantially reduced, and bit data are shifted only by s as shown in FIG. 3(c3). Recording by causing a bit data shift (BUID) is performed in this manner. A curve 61 of FIG. 6 shows results of a measured relation between a recording laser power in the recording portion Pw and a level of output to the same reflected light measuring apparatus as described above in Example 1. That is, in this case, a reproduction signal level approaches an original reproduction signal level in the land 2 by recording.

EXAMPLE 2

Example 1, an example depicts an optical disk exhibiting properties of a first recording mode in FIG. 3, whereas in Example 2, an example illustrates an optical disk according to a second recording mode shown in FIG. 4. The optical disk of Example 2 is the same as the optical disk of Example 1 except for a composition of the reflective film 4.

The reflective film 4 of Example 2 includes $Al_{70}Fe_{15}Ti_{15}$ having a film thickness of 40 nm.

Measured results for the optical disk of Example 2 using a reflected light measuring apparatus are shown in a curve 62 of FIG. 6. In this case, a property shown in the curve 62 is contrary to that shown in the curve 61 of Example 1.

Specifically, in a case where a land 2 and a pit 3 the same as in FIG. 3(a) are provided before recording as shown in FIG. 4(a), an edge 7 in the pit 3 is irradiated with laser light in the same manner as in FIG. 3(b) as shown in FIG. 4(b). However, in this case, as shown in (c2) of FIG. 4(c), a deformed portion 8 reaches a phase height of the land 2 at the initial stage and is then higher than the phase height, and simultaneously an edge of the land 2 at the initial stage on a side of the pit is raised by influence of thermal properties, for example, of the reflective film and the deformed portion 8 is higher than the land 2 at the initial stage. That is, a reproduction signal level is reduced, because the land 2 at the initial stage where a highest reproduction signal level is achieved is raised to a height higher than the phase height. Accordingly, since in practice, an optical pit length gets longer, a signal level indicates as low as a low reproduction signal level at a pit position, for example, as shown in FIG. 4(c3).

In this case, since a reflection level is increased to the same phase height as that of the land 2 during a step of raising the deformed portion 8, an amount of reflected light is increased during that period and then rapidly reduced as shown in the curve 62 of FIG. 6.

As described above, according to an embodiment of the present invention, there are provided a first recording mode where a bit shift described in FIG. 3 occurs in a direction in which a length of a pit is reduced and a second recording mode where a bit shift described in FIG. 4 occurs in a direction in which a length of a pit is substantially increased.

In a configuration according to an embodiment of the present invention, a thickness of a reflective film may be selected from the above-described range of 10 nm to 40 nm. The thinner the film is, the higher sensitivity the film exhibits.

FIG. 7 Table 2 shows results of inspecting a reflectance and recordability of a reflective film 4 of $Al_{(100-x-y)}Fe_xTi_y$, where a film thickness is 40 nm, 20 nm, or 10 nm and x and y are respectively varied.

Here, a case where a reflectance is 35% or more with respect to a Blu-ray Disc standard is indicated by a symbol "○" and a case where a reflectance is less than 35% is indicated by a symbol "×". A case where the reflective film 4 is recordable is indicated by a symbol "○" and a case where the reflective film 4 is not recordable is indicated by a symbol "×".

Figure 8:
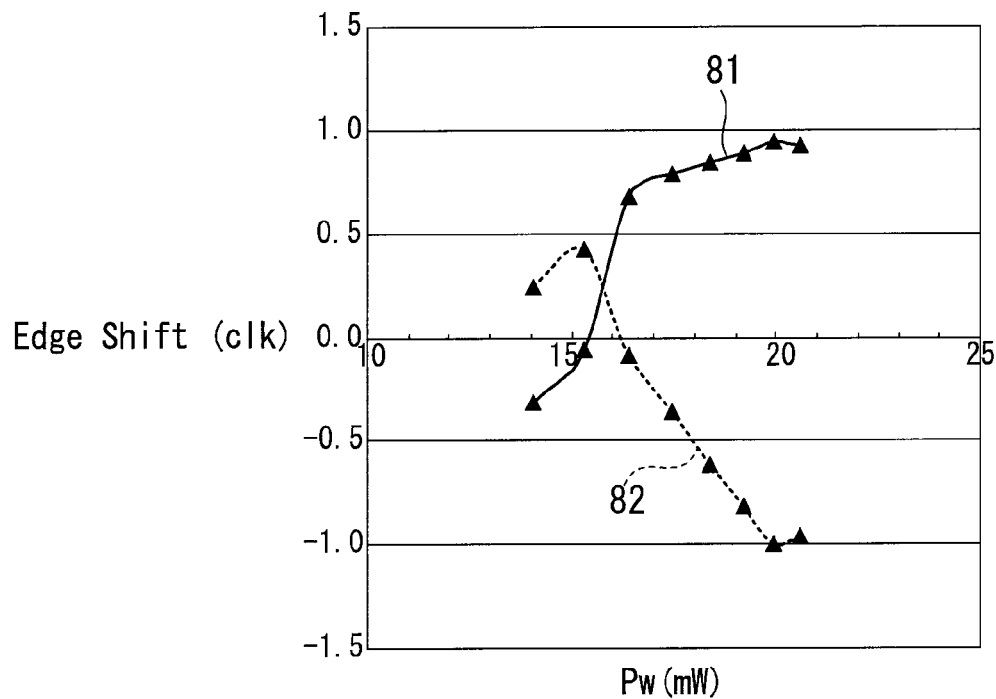
FIG. 8 is a view showing an edge shift amount of a pit in recording in an example of an optical disk according to an embodiment of the present invention.

FIG. 8 shows results of measuring an edge shift amount of a pit 3 with respect to a recording power Pw (represented by a clock number) in a sample No. 13 of FIG. 7 Table 2. Curves 81 and 82 in FIG. 8 show results of measured relation between a recording laser power and a pit edge displacement amount when recording is performed in a back edge of the pit 3 and the relation when recording is performed in a front edge of the pit 3, respectively. In this case, the curves show asymmetrical due to an influence of difference in thermal dispersion or the like.

Figure 9:
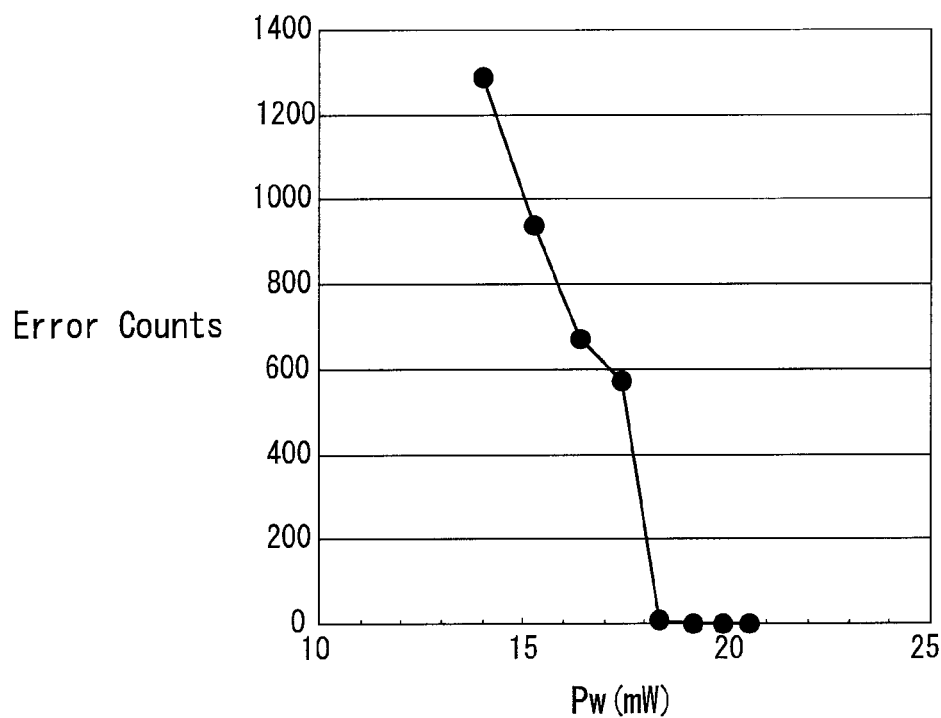
FIG. 9 is a table showing a number of errors with respect to a recording power in an optical disk according to an embodiment of the present invention.

FIG. 9 shows results of measuring a number of errors with respect to a recording power in the same sample No. 13. In this case, a land and a pit may be shifted by one clock and an error may be eliminated by selecting an appropriate recording power.

As clear from the above description, when a reflective film 4 has a thickness of 10 nm to 40 nm and contains Al as a main component, Fe at 3 at % to 15 at %, and Ti at 3 at % to 15 at %, an optical disk may be formed where BUID is well performed.

As described above, according to an embodiment of the present invention, a reflectance of 35% or more may be achieved where original information such as management information or content information is well recorded, and a BD compliant optical disk with excellent durability may be obtained in which recording using BUID is reliably performed with high sensitivity.

An optical disk or a method of producing an optical disk according to an embodiment of the present invention is not limited to the aforementioned Example 1, and records may be altered within the scope of the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk comprising:
a substrate having lands and pits along a recording track where data can be recorded;
a reflective film on the substrate; and
a protective layer on the reflective film, wherein,
the pits are such that when an edge of a pit is irradiated with light transmitted through the protective layer, the pit deforms such that pit data are rewritten and recorded, and
the reflective film is an alloy formed of $Al_{(100-x-y)}Fe_xX_y$, where Al is the main component, and X contains any one or more of Ti, Cu, Au, Pt, and Si,
$3 \leq x \leq 15$,
$3 \leq y \leq 15$,
the reflective film has a thickness from 10 nm to 40 nm,
the reflective film has a surface roughness Ra of 0.8 nm or less, and
the reflective film exhibits a reflectance of 35% or more with respect to the Blu-Ray Disc standard when irradiated by laser light with a wavelength of 405 nm and a numerical aperture of 0.85.

2. An optical disk according to claim 1, wherein the reflective film is $Al_{(100-x-y)}Fe_xTi_y$.

3. A method of producing an optical disk comprising the steps of:
preparing a substrate having lands and pits arranged and formed along a recording track by mastering so that data are recorded thereon;
depositing a reflective film on a surface having the lands and the pits formed of the substrate;
forming a protective layer on the reflective film; and
irradiating edges of the pits in the array direction with recording laser light transmitted through the protective layer to deform the pits, so that data by the pits are bit shifted by the deformation of the pits to record data by rewriting, wherein
the step of depositing the reflective film is a step of depositing an $Al_{(100-x-y)}Fe_xX_y$ alloy having Al as a main component, where X contains any one or more of Ti, Cu, Au, Pt, and Si,
$3 \leq x \leq 15$,
$3 \leq y \leq 15$,
the reflective film has a thickness from 10 nm to 40 nm,
the reflective film has a surface roughness Ra of 0.8 nm or less, and
the reflective film exhibits a reflectance of 35% or more with respect to the Blu-Ray Disc standard when irradiated by laser light with a wavelength of 405 nm and a numerical aperture of 0.85.

4. A method of producing an optical disk according to claim 3, wherein
the reflective film has a thickness of 10 nm to 40 nm.

5. A method of producing an optical disk according to claim 3, wherein the reflective film is $Al_{(100-x-y)}Fe_xTi_y$.

* * * * *